United States Patent [19]

Yamamoto et al.

[11] 4,268,295

[45] May 19, 1981

[54] METHOD FOR MANUFACTURING CRUSHED SANDS FROM BLAST FURNACE WATER GRANULATED SLAGS

[75] Inventors: Katsuji Yamamoto, Suita; Yuichiro Iwasaki, Ibaraki; Akira Adachi, Takatsuki; Toshiro Kawata, Tonclabayashi; Keisuke Nagano, Nara; Seiichi Fujita, Takaishi; Mikio Harada, Sakai, all of Japan

[73] Assignee: Nakayama Steel Works, Limited, Osaka, Japan

[21] Appl. No.: 55,456

[22] Filed: Jul. 6, 1979

Related U.S. Application Data

[63] Continuation of Ser. No. 876,119, Feb. 8, 1978, abandoned.

[30] Foreign Application Priority Data

Oct. 13, 1977 [JP] Japan ............................. 52-123341

[51] Int. Cl.³ .......................................... C03B 19/10

[52] U.S. Cl. .......................................... 65/19; 65/141; 75/24

[58] Field of Search ............... 65/19, 20, 141; 75/24

[56] References Cited

U.S. PATENT DOCUMENTS

| | | | |
|---|---|---|---|
| 1,849,090 | 3/1932 | Hunsaker | 65/20 |
| 3,900,304 | 8/1975 | Rehmus | 65/19 |
| 4,115,089 | 9/1978 | Metz et al. | 65/19 |
| 4,152,131 | 5/1979 | Gagneraud | 65/19X |

*Primary Examiner*—Robert L. Lindsay, Jr.
*Attorney, Agent, or Firm*—Mason, Fenwick & Lawrence

[57] ABSTRACT

Apparatus and method for manufacturing crushed sands from blast furnace melted slags including maintaining molten blast furnace melted slags out of contact with water while cooling the molten slags to a temperature between 850° C. to 1300° C. and then rapidly cooling the cooled slags with water thereby producing coarse grain hard quality water processed slags.

8 Claims, 11 Drawing Figures

U.S. Patent May 19, 1981 Sheet 1 of 4 4,268,295
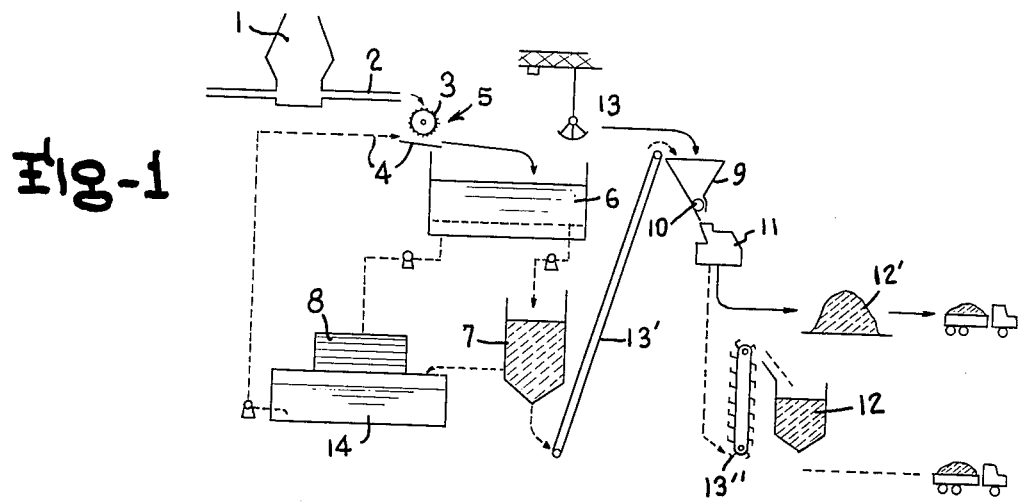
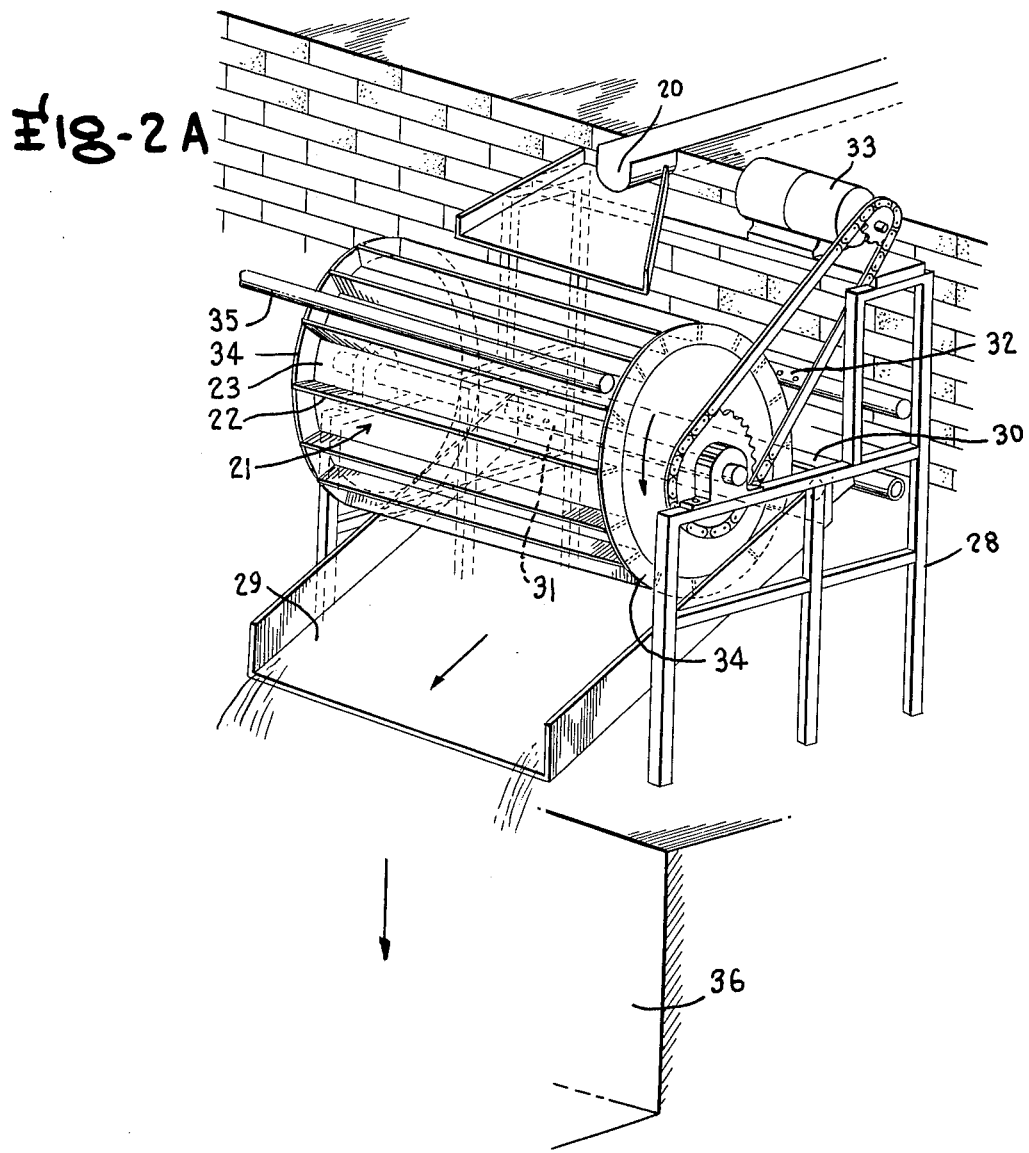

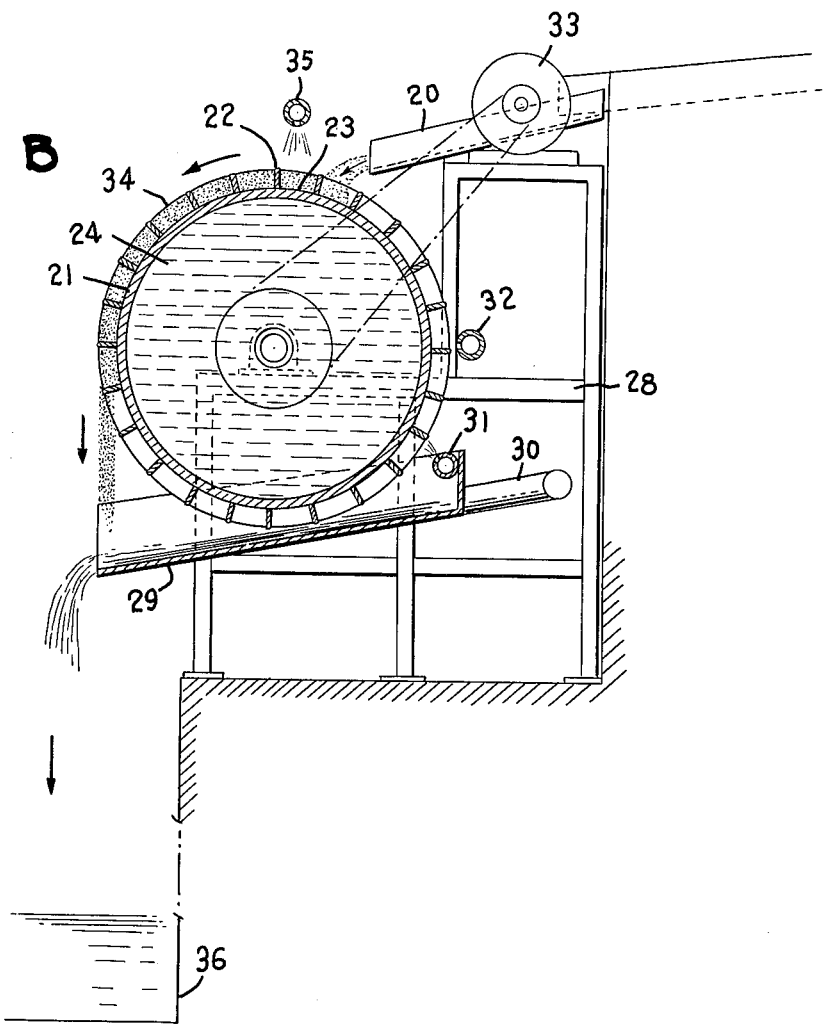
Fig-2 B
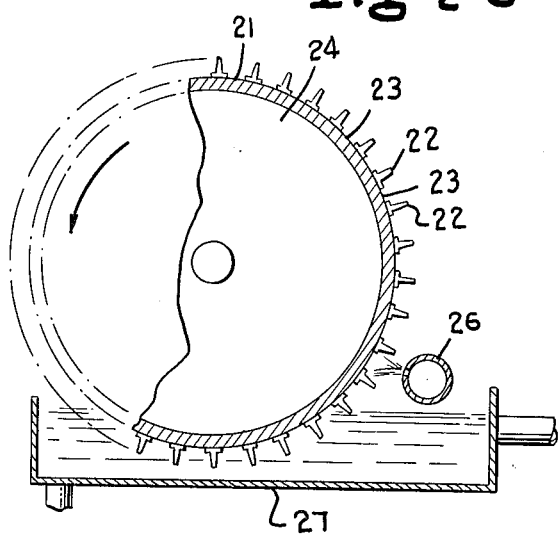
Fig-2 C
Fig-2 D

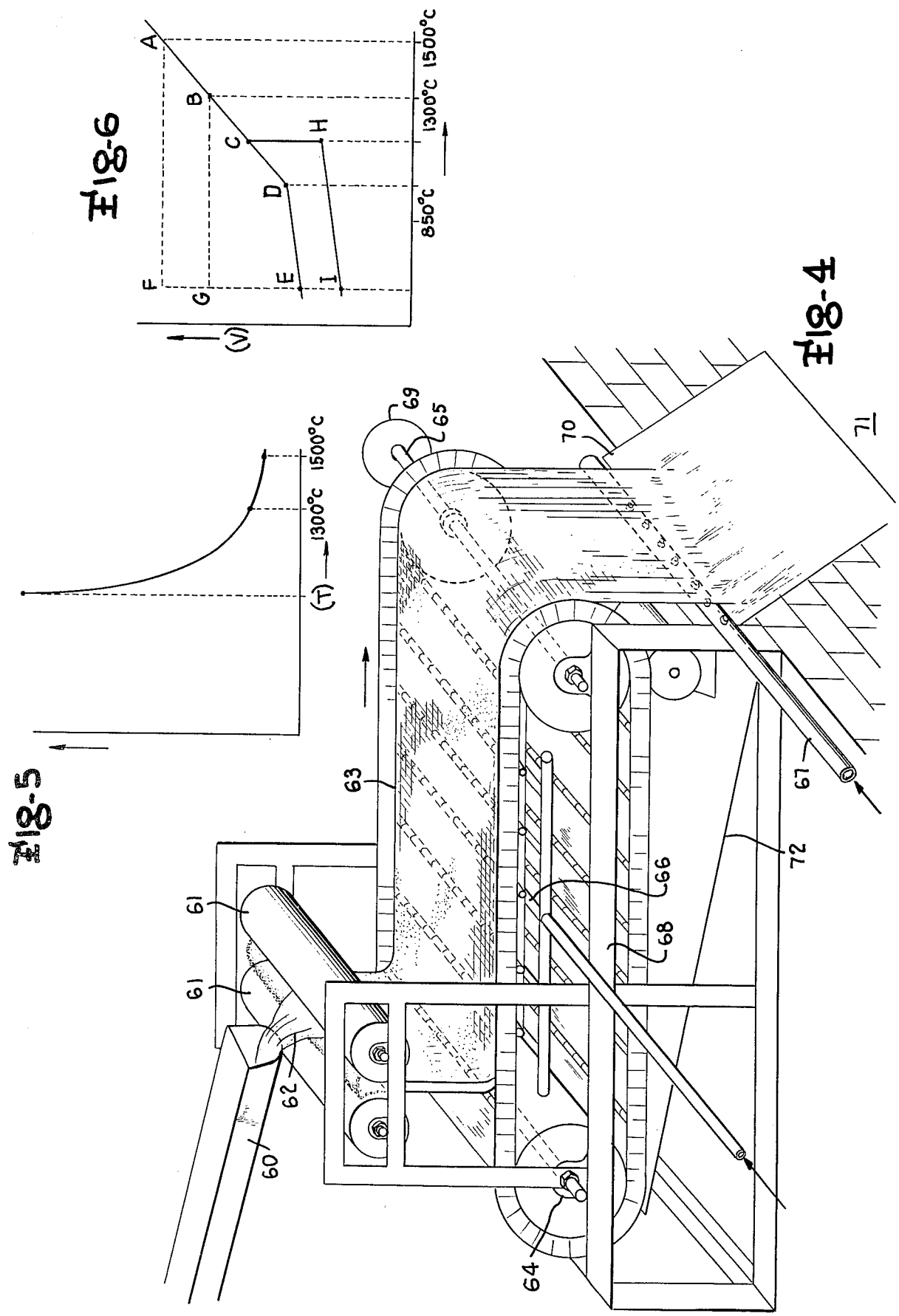

METHOD FOR MANUFACTURING CRUSHED SANDS FROM BLAST FURNACE WATER GRANULATED SLAGS

This is a continuation of application Ser. No. 876,119, filed Feb. 8, 1978, now abandoned.

This invention relates to a method for manufacturing crushed sands from blast furnace melted slags and also an apparatus utilizing the method. The apparatus performs a series of the processes for a quick cooling of blast furnace melted slags to control the temperature of the melted slags. These melted slags have a chemical composition mainly composed of a glass structure obtained by a rapid water cooling and are then processed into hard quality water processed slags. Finally the slags are crushed into artificial granular sands.

In general, the melted slags from blast furnaces are produced secondarily in manufacturing pig irons from iron ores in the blast furnace. The slags are in a melted state at a high temperature of about 1,500° C. immediately after discharge from the blast furnace. Melted slags can be broadly divided into gradual cooled slags (a crystalline structure) and quick cooled slags (a glass structure) according to the method of a cooling treatment. Additionally, there are expanded slags by a semi-cooling treatment and a rockwool having a fibre structure produced by a rapid cooling treatment.

This invention relates to a method for a rapid cooling process including a dry system called wind processed slags and a wet system called blast furnace water processed slags.

The blast furnace water processed slags are at present mostly used for a blast furnace cement material, cement clinker material, concrete admixture, land foundation reforming material, silicate lime fertilizer and the like. These wet processed slags are not usable for fine aggregates of concrete and asphalt because, as produced, they are of light quality, fragility and weak strength. It is necessary, therefore, to process these slags into heavy and hard quality water processed slags which require a crushing process to improve the shape and size of the grains. As in the manner mentioned above, the melted slags, which are produced simultaneously with pig iron, are fractured rapidly by a cooling water and then processed into fine aggregates for concrete. The products thus obtained are the granulated crushed sands of the blast furnance slags of this invention.

Table 1, described below, shows the differences in the physical properties and aspects of use between the granulated sands of the blast furnace melted slags of the present invention and the conventional ordinary water processed slags.

TABLE 1

(Physical properties of water processed slags)

| Condition of water processed slags. Measurement items. | Ordinary water processed slags. | | Crushed sands of blast furnace melted slags. | |
|---|---|---|---|---|
| | Coarse grains. | Crushed | Coarse grains. | Crushed. |
| Genuine specific gravity. JIS M8717 | 2.80–2.95 | 2.80–2.95 | 2.80–2.95 | 2.80–2.95 |
| Surface dryness specific gravity. JIS A1109 | 1.70–2.30 | 1.80–2.50 | 2.00–2.70 | 2.50–2.90 |
| Unit capacity weight. JIS A1104(t/m$^3$) | 0.50–1.10 | 0.60–1.45 | 1.10–1.50 | 1.45–1.85 |
| Absorption modulus. JIS A1109 (%) | 10.0–40.0 | 5.0–20.0 | 5.0–15.0 | 0.6–2.5 |
| Coarse grain modulus. | 3.0–4.5 | 2.5–3.0 | .0–4.5 | 2.5–3.0 |
| Grain shape. Grain size. JIS A1102 | — | poor | — | Passed. Standard of fine aggregate.JASS5 2nd grade |

| (Aspects of Use) | |
|---|---|
| Ordinary water processed slags. | Crushed sands of blast furnace slags. |
| (1) Blast furnace slags. | (1)–(7) on left side. |
| (2) Concrete admixture. | (8) Fine aggregates for concrete block |
| (3) Cement clinker material | (9) Fine aggregates for concrete. |
| (4) Light weight bubbled concrete material. | (10) Fine aggregates for asphalt. |
| (5) Land foundation reforming material. | (11) Plasterers' aggregates. |
| (6) Road-bed and road-board stabilization processing material. | (12) Other engineering and building aggregates. |
| (7) Silicate lime fertilizer. | |

In the conventional method for manufacturing blast furnace water processed slags, the melted slags, in the state of fluidity at the temperature of about 1,550° C.–1,300° C., flow out through the melted slag gutter from the blast furnace and are flowed directly or by a ladle pan to a water processed slag blowing means. The molten slag is then cooled quickly and broken into pieces by pressurized water directed onto the slag from the blowing nozzle thereby producing the water processed slags. The melted slags in the conventional manufacturing method of water processed slags are cooled very rapidly by large quantities of pressurized water (ordinary water/melted slags=5–20, hydraulic pressure 2.5 Kg/cm$^2$up). The homogeneous hard quality water processed slags are impossible to produce by this process and it is also difficult to control the desired quality of the slags since the physical properties of the water processed slags undergo changes on account of changes in the blast furnace operation.

The inventors of this invention extensively studied and examined the temperature, chemical composition and disposing quantity of the melted slags; the temperature, velocity and quantity of the jet water stream; and the contact condition of the melted slags with the water, all of which influence the physical properties of the products of the water processed slags, and they concluded that the temperature of the melted slags when contacting the water is the primary factor influencing the physical properties of the water processed melted slags. The homogeneous hard quality water processed slags according to the present invention are produced by carefully supervising the temperature of the melted slags. The hard and fine coarse grains are extracted from the water and granulated by a crusher, to achieve the desired shape and size of grain, which are the blast furnace melted slag crushed sands according to the present invention.

This invention provides water processed slags of homogeneous hard quality and less water absorption volume which is capable of being manufactured extremely economically without any public pollution. Slags produced according to the present invention can be used in fields such as the fine aggregate for road foundations, road-beds, cement material as well as the fine aggregates for concrete, concrete block, asphalt, and plasterer's granulated sands, because, as compared with the ordinary water processed slags, the density is extremely high.

One object of the invention is to provide a method for producing fine aggregates, in which the temperature of the blast furnace melted slags is reduced to the range of 850° C. to 1,300° C. by forced cooling and then are cooled rapidly with cooling water to produce rough grain hard quality water processed melted slags. These slags are then broken into pieces in order to improve the shape and size of the grains whereby the fine aggregates can be obtained.

Another object of the invention is to provide the apparatuses to practice this method, which includes a device to cool the melted slags quickly as the melted slags are flowed out from the blast furnace, and a high-velocity water jet to cool the melted slags rapidly. The cooling device includes a water tank such as a water depositing tank or a water agitating tank positioned below the water jet. A dehydrating tank may be positioned next to the water tank if the water tank is a water agitating tank. A crusher is provided next to the water depositing tank or dehydrating tank, to which the water extracted rough grains are moved for crushing. After crushing, the grains are moved to a delivery tank or the shipping yard for storage or shipment.

The method of this invention may also be practiced utilizing a ladle pan.

Other objects and advantages of the invention will become more apparent to those persons having ordinary skill in the art to which the present invention pertains from the following description taken in conjunction with the accompanying drawings wherein:

FIG. 1 is a schematic diagrammatic view of a device embodying the present invention;

FIG. 2A is a fragmentary perspective view of the preferred embodiment of the cooling portion of the present invention;

FIG. 2B is a longitudinal sectional side elevational view of the embodiment shown in FIG. 2A;

FIG. 2C is a longitudinal sectional side elevational view of a first alternative embodiment of the low-speed rotary portion shown in FIG. 2B;

FIG. 2D is a view similar to FIG. 2B but of a second alternative embodiment;

FIG. 4 is a fragmentary perspective view of a second modification of the embodiment shown in FIG. 2A;

FIG. 5 is a graph of viscosity versus temperature of blast furnace slags; and

FIG. 6 is a graph of the relationship between solidity, fluidity and glass versus temperature.

Figure 3:
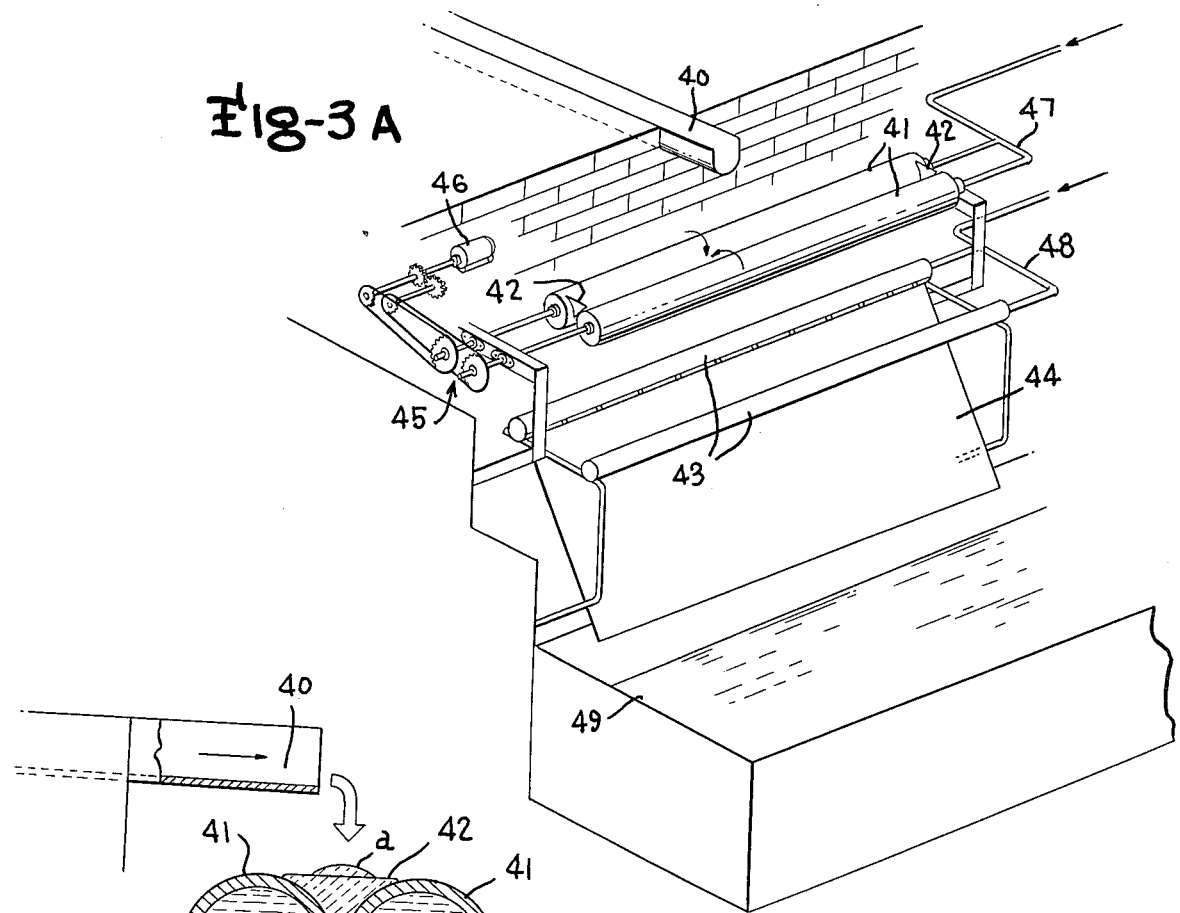
FIG. 3A is a fragmentary perspective view of a first modification of the embodiment shown in FIG. 2A.
FIG. 3B is a horizontal sectional side elevational view of the embodiment shown in FIG. 3A.
FIG. 3C is a longitudinal sectional side elevational view of an alternative embodiment of the low-speed rotary portion shown in FIG. 2B.
Figure 3:
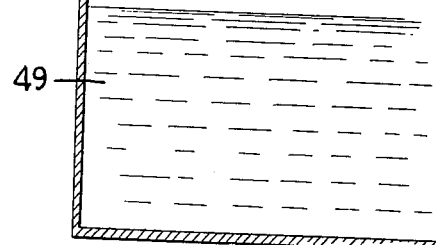
Figure 3:
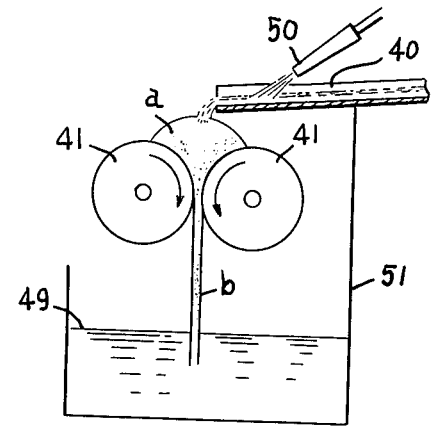

One embodiment of the invention will be explained hereunder in conjunction with FIG. 1 of the accompanying drawings, in which the melted slags are discharged from a blast furnace (1) and flowed downwardly passing through a melted slag gutter (2). The slags are cooled rapidly to the range of 1,300° C. to 850° C. by cooling means (3). Various embodiments of the cooling means are shown in FIGS. 2 through 4, with a detailed explanation being provided hereafter. The cooled melted slags are formed into the hard and fine coarse grains by cooling rapidly with water either by pouring the melted slags into water tank (6) by the chute with a high velocity jet water spurted out from the water jet mechanism (4) or by pouring the melted slags directly into the water tank (6).

Referring to FIG. 1, a water tank (6) receives the melted slag from the blast furnace (1) through gutter (2) and cooling device (3), the water is drained from a grate provided at the bottom thereof so that the coarse grains are dehydrated, or in case the water tank (6) is a water agitating tank, the coarse grains are transported together with water to the dehydrated tank (7) by a slurry pump to extract the water. The cooling water is recirculated from the water circulating tank (14). When the water rises to 80°–90° C. in temperature, it is desirable to cool the water by a cooling tower (8) arranged in juxtaposition with the water circulating tank.

The coarse grains of the hard quality water processed slags of this invention thus dehydrated have a coarse grain modulus of about 3.0–4.5, which is considerably larger than that of 2.5–3.5 for ordinary water processed slags, and have a unit capacity weight of 1.10–1.50 which is heavier and harder than that of 0.50–1.10 for ordinary water processed slags.

Observations by a stereomicroscope and X-ray dialyzer on the differences between the dehydrated hard quality water crushed slags and the ordinary water crushed slags mentioned above disclose that the former are of the uncrystalline structure (glass structure) being a massive glass containing air bubbles in part, while the latter are of the perfect uncrystalline structure being a bubble glass containing numerous air bubbles. The differences in the unit capacity weight between the two is attributable to the air bubbles.

The dehydrated coarse grains containing 5–15% moisture are transported directly from the water tank (6) or the dehydrating tank (7) to a supply feeder (10), for example a roll feeder and the like, through a supply hopper (9), and a controlled rate of flow of the coarse grains from the supply feeder (10) is forwarded to a crusher (11) for crushing.

Crushing tests by various crushers were performed in order to obtain the desired size of grains. An impact crusher, a ball mill, and a rod mill proved to be the most suitable crushers. The crushers of other models are adequate for use if the special characters thereof are taken into consideration. When an exhaust chute is provided at a lower portion of the crusher, a precaution must be taken with respect to the shape and inclination of the chute to prevent an adhesion of lump powders to the exhaust chute, and furthermore a prevention measure for a growth of the adhered powders must be taken by constantly vibrating the exhaust chute by a vibrator during the crushing operations.

The crushed products are stored either in a delivery tank (12) or a shipping yard (12'). A bucket crane (13) or a belt conveyor (13') and/or a bucket conveyor (13") may be installed independently or in combination in order to transport the rough grains and crushed products.

Moreover, in compliance with the demands of the users, it is possible to manufacture small aggregates of various sizes (for example, fine mesh or coarse mesh) by regulating the crushed size of grains.

It is necessary to adjust the temperature of the melted slags to the extent of 1,300° C. down to 850° C., since as shown in FIG. 5, the viscosity of the melted slags rises sharply and fluidity thereof sharply decreases when the temperature of the melted slags is below 1,300° C. The melted slags are generally processed by the water at temperatures of 1,300° C. up to 1,550° C. The invention, however, can be performed well without such fluidity at the time of rapid water cooling, and the temperature at which small cracks are formed by the rapid water cooling is good at temperatures over 850° C. Solidification is possible even if the temperature is below 850° C.; however, if the temperature is too low, small cracks may not be formed and it is dangerous to handle these materials since the crushed surface has sharp edges. The apparatus for controlling the temperature of the melted slags at temperatures from 1,300° C. down to 850° C. utilize such methods as an indirect cooling method by the thermo adjustment means as shown in FIGS. 2 to 4, a method for blowing certain particles other than the water for example, gas such as air, steam and the like, directly onto the melted slags or a direct cooling method for decreasing the temperature of the melted slags by mixing sands, iron-sands, cooling water, processed slags and the like mechanically with the melted slags. Additionally, a method for regulating the temperature of the melted slags to the aforesaid extent may be used in combination with a direct cooling method and an indirect cooling method.

Several preferred embodiments of the thermo adjustment means of the present invention will be described hereunder, with reference to FIGS. 2 to 4 of the accompanying drawings.

(A) An explanation is made to the construction of the appratus as shown in FIGS. 2A–D, in which the numeral (20) indicates the melted slag gutter for discharing the blast furnace melted slags, a fore-end thereof being broadened out transversely to cause the melted slags to spread thereon as widely as possible. A low-speed rotary means (21) includes a roll-shaped or many faced drum having a projection (22) and a recess (23) as well as a thermal exchange surface thereon, which decrease the temperature of the melted slags flowing from the melted slag gutter (20). The projections (22) and recesses (23) are formed in the finny shape as shown in FIGS. 2-(A), (B), (C) or a conical-head projection in cross section (22') as shown in FIG. 2-(D). These projections (22) and recesses (23) prevent the melted slags from slipping off the surface of the roll without contacting sufficiently with the roll surface, and they also increase the cooling efficiency by enlarging the thermal exchange zone. To provide the thermal exchange capability on the surface of the low-speed rotary drum (21), a water chamber (24) is arranged in an inner portion of the drum (21) with means to circulate cooling water therein.

In the other embodiment shown in FIG. 2-(D), a water cooling device to cool an inner portion of the roll is provided with a tubular circulating pipe system (25) having a number of divided sections allowing the cooling water to flow along an inner circumference of the back surface of the rotary drum (21) so that an outer surface of the roll is cooled from an inner portion thereof. Another device for cooling an outer surface of the roll is provided with a pipe system (26) as shown in FIG. 2-(C) for spraying cooling water on an outer circumferential surface of the rotary drum (21) to cool the roll from the outer surface thereof and a water pool (27) is provided to immerse a lower periphery of the roll whereby the outer and inner surface of the roll are simultaneously cooled. A roll mounting frame (28) supports the low-speed rotary drum (21) in a manner of pivotal free movement. A cooling water chute (29) is provided below the low-speed rotary drum (21). A water feeding pipe (30) provides the high velocity water stream. A water feeding pipe (31) for spraying the high-pressure water is provided at a lower periphery side of the rotary drum (21), which serves to remove unreleased melted slags sticking on the surface of the rotary drum (21) as well as to cool the surface of the drum. An air pipe 32 for drying the surface of the rotary drum (21) directs air onto the roll surface to dry the surface thereof. A speed change gear (33) for low-speed rotation or a motor equipped with a speed reducer may be provided to rotate the low-speed rotary drum (21). A side edge plate (34) prevents an overflow of the melted slags and is arranged at both side ends on the surface of the rotary drum (21). A high-pressure air blowing pipe (35) is positioned over the rotary drum (21) to promote the spreading of the melted slags on the rotary means (21), and positioned beneath the reverse side of the low-speed rotary means (21) is a water tank (36).

(B) Referring now to FIG. 3, an alternate cooling system includes a melted slag gutter (40), a plurality of water cooled rolls (41) arranged in a parallel row below the melted slag gutter (40) for receiving the melted slags from the melted slag gutter (40). The rolls (41) receive cooling water from a cooling water pipe (47). The water cooled rolls (41) are arranged to rotate in the direction of arrows. A melted slag guard plate (42) is provided between the water cooling rolls (41) at both upper side ends thereof so that the melted slags do not flow out the ends between the rollers. A nozzle headers (43) has numerous holes, slits or nozzles for producing a water spray and is disposed under the water cooling rolls (41) in parallel with said rolls. A chute (44) is positioned beneath said nozzle headers (43) at a slanted position. The rolls (41) are rotated by a driving means (45) including a chain and a chain wheel which are driven by a driving motor (46). A water pipe (48) provides water to the nozzle header (43) to produce a jet water stream. A water tank (49) is arranged in a manner to receive materials sliding down the jet water stream chute (44). When the melted slags (a) are poured between the water cooled rolls (41) from the melted slag gutter (40), the slags are cooled by the water cooled rolls (41) which are rotated to develop a layer of melted slags (b) which flows downwardly therebetween.

The device as shown in FIG. 3-(C) employs direct cooling for blowing water processed slags into the melted slags in combination with the water cooled rolls. The melted slags (a) are cooled directly by blowing sands and water processed slags from blowing nozzle (50) toward the vicinity of a discharging port of the melted slag gutter (40). The melted slags (a) pass between a pair of the water cooled rolls (41) having water flowing through the interior thereof, whereby the melted slags (a) are shaped into a thin layer of melted slags (b). After adjusting the temperature to between 1,300° C. to 850° C., the slags (b) are soaked in a water tank (49) enclosed by a side wall (51) and/or immersed in a water stream thereby producing hard quality water processed slags by effecting rapid water cooling and breaking into pieces.

(C) Referring to FIG. 4, there is shown an alternate system including a melted slag gutter (60) for discharing the melted slags onto a pair of melted slag reducing rolls (61) being arranged in a manner to rotate inwardly toward each other to enable the melted slags (62) to pass through between the rolls. A conveyor (63) having a heat exchange capability is disposed beneath the melted slag reducing rolls (61) with the movement of the conveyor (63) being moved in the direction of the arrow by means of a driven shaft (64), a driving shaft (65), and a drive transmission means 69. A cooling pipe (66) sprays cooling water against the back side of the conveyor to cool the surface metal plates forming the conveyor (63) A cooling water pipe (67) for a jet water stream is disposed at an end portion of the conveyor (63) enabling the melted slags loaded on the conveyor (63) to pass through the jet water stream. A conveyor frame (68) supports the conveyor (63). A chute (70) for a jet water stream is provided at an end portion of the conveyor (63). A cooling water receiving pan (72) is arranged in a manner sloped toward a water tank (71).

The temperature, velocity and volume of the jet water stream have no direct influences on the solidification of the water processed slags of the invention, however, these factors are preferably maintained in the following ranges:

(1) The temperature of the jet water stream is below 100° C.
(2) The velocity of the jet water stream ranges from the zero to the high-speed water stream.
(3) The volume of the jet water stream is 1 to 3 or more times the volume of melted slags.
(4) The contact condition with the water is to be made as quickly as possible.

A theoretical detailed explanation of the contents of this invention are as follows:

Referring now to FIG. 6, this graph shows the relation of the state between solid, liquid and glass, in which observation by X-ray dialyzer confirmed that the conventional ordinary water processed slags are cooled rapidly and directly with the water (a quick water cooling) from the temperature range A-B (1,550° C.–1,300° C.), which are then turned into A-F-E- or B-G-E and finally developed into the glass E. According to the present invention, the melted slags, when in the temperature range of A-B, are not cooled directly with the water, but instead are cooled below B (1,300° C.) by means of an air cooling. A stream of water and indirect cooling are used to rapidly cool the melted slags such that the slags are turned into B-G-E or B-C-D-E and then developed into the glass E. X-ray analysis confirms this material to be glass.

The fluid slag at A-B in the conventional manufacturing method of the water processed slags are of high temperature and low viscosity as compared with B-C-D, and when the water acts on the melted slags, they are easily mixed with the water on account of the nature of the high fluidity. As the temperature of the melted slags decreases and the viscosity increases a thin layer of the surface is cooled rapidly with water and becomes the glass structure which causes the entire surface to be covered with numerous microscopic cracks. The water, after passing through these cracks, acts on the fluid on the next layer, vitrifies that layer and then turns into a water vapor (gas) which causes air bubbles.

The vitrification-crack-water penetration-gasification phases occur repeatedly and the entire body becomes the conventional bubble glass. Additionally, components within the slags react with the water to form gases. For example, CaS, reacts with the water to generate hydrogen sulfide gas, $CaS+2H_2O \rightarrow Ca(OH)_2+H_2S(G)\uparrow$ The higher the temperature of the melted slags, the higher the dissolution of unstable particles contained in the melted slags and the higher the gas generation by the gas generation component dissolved in the melted slags. The melted slags therefor form bubble glass containing large amounts of gas even if rapidly cooled with water, and consequently, when the melted slags are cooled and the entire body therefore becomes vitrified, the gases expand as many as several times and create the porous bubble glass in a brittle or pumicious state. In this instance, the ordinary water processed slags, which are of the light quality, produce low compressed strength when the melted slags are mixed with a mortar, concrete or the like.

On the other hand, in the manufacturing method of the hard quality water processed melted slags according to this invention, the state of fluidity B-C decreases with temperature of the melted slags to the predetermined degree at the low temperature. High viscosity and less gas generation is thereby created by the dissolution of the unstable particles as compared with the state of fluidity A-B, and when the cooling water acts on the melted slags, the melted slags do not mix with the water and no change in shape thereof occurs because of the high viscosity. Accordingly, the melted slags which are cooled to the range of 1,300° C. to 850° C. are then poured into the water stream or into the water tank to rapidly cool them. The melted slags form glass by the cooling effect thereof, and a number of cracks are produced in the glass structure caused by the quick shrinking. The small glass lumps are produced (about 0.3–5 mm), which are the uniform and hard quality coarse grain water processed slags of this invention. These coarse grain water processed slags are granulated by the crusher to form the desired shape and size of grain.

Several embodiments of the manufacturing method for crushed sands of the blast furnace melted slags of this invention and the measured characteristics of crushed sands of the blast furnace melted slags obtained by this method are shown hereunder.

1st Embodiment

Blast furnace melted slags are poured into the low-speed rotary means equipped with many concave and convex heat exchange surfaces thereof as shown in FIGS. 2-(A) and 2-(B), where the melted slags are cooled from 1,480° C. down to 1,290° C. The slags are then poured into the water stream to shape them into the rough grain water processed slags, which are then crushed from which granulated sands of the slags as shown in TABLE 2 are obtained. (Slag I)

2nd Embodiment

The blast furnace melted slags are cooled from 1,460° C. down to 1,250° C. by a pair of water cooled rolls as shown in FIGS. 3-(A) and 3-(B) and are poured into a high velocity water stream to form them into the coarse grain water processed slags, which are then crushed from which the granulated sands of the slags as shown in TABLE 2 are obtained. (Slag II)

3rd Embodiment

The blast furnace melted slags are cooled from 1,510° C. down to 1,220° C. by the pan-conveyor having the heat exchanger as shown in FIG. 4 and are poured into the high velocity water stream to form them into the coarse grain water processed slags, which are then crushed from which the granulated sands of the slags as shown in TABLE 2 are obtained. (Slag III)

4th Embodiment

The blast furnace melted slags are cooled from 1,490° C. down to 930° C. by driving the pan-conveyor having a heat exchanger as shown in FIG. 4 and are poured into the water to form the coarse grain water processed slags, which are then crushed from which the granular sands of the slags as shown in TABLE 2 are obtained. (Slag IV)

TABLE 2

|  |  | SLAG I | SLAG II | SLAG III | SLAG IV | Ordinary Water Processed Slag |
|---|---|---|---|---|---|---|
| MELTED SLAG Temperature (°C.) | Before process | 1480 | 1460 | 1510 | 1490 | 1470 |
|  | After process | 1290 | 1250 | 1220 | 930 | — |
| Genuine Specific Gravity JIS M8717 |  | 2.85 | 2.85 | 2.85 | 2.85 | 2.85 |
| COARSE GRAINS |  |  |  |  |  |  |
| Surface Dryness Specific Gravity JIS A1109 |  | 2.44 | 2.41 | 2.55 | 2.63 | 1.98 |
| Unit Capacity Weight (t/m$^3$) JIS A1104 |  | 1.25 | 1.13 | 1.35 | 1.36 | 0.88 |
| Water Absorption Modulus (%) JIS A1109 |  | 2.92 | 3.73 | 1.32 | 0.60 | 21.2 |
| Rate of Coarse Grains |  | 3.83 | 4.13 | 3.94 | 4.02 | 3.71 |
| CRUSHED SANDS OF SLAGS |  |  |  |  |  |  |
| Surface Dryness Specific Gravity JIS A1109 |  | 2.55 | 2.63 | 2.69 | 2.76 | 2.25 |
| Unit Capacity Weight (t/m$^3$) JIS A1104 |  | 1.45 | 1.54 | 1.64 | 1.73 | 1.22 |
| Water Absorption Modulus (%) JIS A1109 |  | 1.71 | 1.01 | 1.01 | 0.50 | 14.4 |
| Rate of Coarse Grains |  | 2.91 | 2.59 | 2.85 | 2.63 | 2.86 |

The figures stated in TABLE 2 for the ordinary water processed slags are the average value of the coarse grain water processed slags and the crushed slags produced by the manufacturing apparatus of the front furnace water processed slags.

As will be seen from the above, the conventional ordinary water processed slags are of a porous structure and the unit capacity weight thereof is low. The use of this conventional slag is limited as they are limited to use as the materials of cement and the like. On the other hand, according to the method of this invention, the homogeneous and hard quality water processed slags are not only produced much more easily but are also useful for numerous broader applications such as the materials for land reformation, the auxiliary materials for road bed, the materials for cement as well as the small aggregates for concrete, concrete block and asphalt, and also the sands for the plasterers and the like, because of the facts that as compared with that of the conventional ordinary water processed slags, the crushed sands of the blast furnace slags of the invention are extremely large in density. The crushed sands of the blast furnace slags produced by the utility crusher are obtained in the following scope of the condition in TABLE 3.

TABLE 3

|  | Crushed Sands of Blast Furnace Slags | |
|---|---|---|
| MESH (mm) | 10 | 100 |
|  | 5 | 99–100 |
|  | 2.5 | 92–96 |

TABLE 3-continued

|  | Crushed Sands of Blast Furnace Slags | |
|---|---|---|
| Passed Quantity (%) | 1.2 | 61–72 |
|  | 0.6 | 32–40 |
|  | 0.3 | 17–21 |
|  | 0.15 | 7–10 |
| Coarse Grain Modulus |  | 2.69–2.98 |
| Unit Capacity Weight (t/m3) |  | 1.40–1.76 |
| Specific Gravity for Absolute Dryness |  | 2.53–2.78 |
| Suction Modulus (%) |  | 0.5–2.5 |
| Glass Quantity (%) |  | 90.5–99.0 |

The conventional crushed sands of gradual cooled slags, the ordinary water processed slags of the ladle pan system, the ordinary water processed slags of the front furnace system and the crushed sands of the blast furnace slags of the invention were all left untouched in storage for a period of one month and then PH values and liquation tests were performed. The comparative measurements of these tests are shown in TABLE 4 as follows:

TABLE 4

|  | Liquation Tests (after one month in the sheds) | | |
|---|---|---|---|
|  | P H | Ca$^{2+}$ (ppm) | T S (ppm) |
| Crushed Sands of gradual Cooled Slags. | 10.4 | 130 | 111 |
| Ordinary Water Processed Slags of Ladle Pan System | 9.9 | 20.4 | 4.3 |
| Ordinary Water Processed Slags of Front Furnace System | 9.4 | 20.1 | 4.5 |
| Crushed Sands of Blast Furnace Slags | 9.0 | 20.0 | 2.1 |

TABLE 4-continued

| | Liquation Tests (after one month in the sheds) | | |
|---|---|---|---|
| | P H | Ca$^{2+}$ (ppm) | T S (ppm) |
| (by method of the invention) | | | |

The crushed sands of the blast furnace slags manufactured by the method of this invention as described above and more than 85% glass structure in the specimens in TABLE 3 and in TABLE 4. There is consequently no environment pollution even in the liquation test. The manufacturing method for the crushed sands of the blast furnace slags of the invention is characterized by the front furnace system, but the method is also applicable to the ladle pan system; however, the glass structure may be below 85% according to the cooling condition of the melted slags in the ladle pan.

From the foregoing detailed description it will be evident that there are a number of changes, adaptations and modifications of the present invention which come within the province of these skilled in the art. However, it is intended that all such variations, not departing from the spirit of the invention, be considered as within the scope thereof as limited solely by the appended claims.

We claim:

1. A continuous flow method for manufacturing hard and heavy crushed sands from ferrous blast furnace melted slags comprising the steps of continuously cooling ferrous blast furnace melted slags flowing from a blast furnace by heat exchange with a cooling media to a temperature between 850° C. to 1300° C. while maintaining the ferrous blast furnace melted slags out of direct contact with water and then immediately rapidly further cooling the cooled slags by direct contact with water thereby producing coarse grain hard quality water processed slags.

2. The method of claim 1 additionally including the step of crushing the coarse grain hard quality water processed slags to improve the shape and size of the grains for producing small aggregates.

3. The method of claim 1 wherein said rapid cooling of the cooled slags is accomplished by spraying the slags with a high velocity jet of water and soaking the slags in a tank of water.

4. The method of claim 3 wherein the water in said tank is agitated.

5. The method of claim 1 additionally including extracting water from the grains to form dehydrated grains.

6. The method of claim 5 additionally including the step of crushing the coarse grain hard quality water processed slags to improve the shape and size of the grains for producing small aggregates.

7. The method of claim 2 additionally including the step of aging the grains to equalize the quality of the crushed products.

8. The method of either claims 1 wherein said cooling media is water in non-contacting heat exchange relation to the ferrous blast furnace melted slags.

* * * * *

UNITED STATES PATENT AND TRADEMARK OFFICE
CERTIFICATE OF CORRECTION

PATENT NO. : 4,268,295
DATED : May 19, 1981
INVENTOR(S) : YAMAMOTO ET AL.

It is certified that error appears in the above-identified patent and that said Letters Patent are hereby corrected as shown below:

The city of residence of Inventor KAWATA is changed to -- TONDABAYASHI --.

Column 2, line 4 ".0-4.5" is changed to read -- 3.0-4.5 --.

Signed and Sealed this

Twenty-first Day of September 1982

[SEAL]

Attest:

GERALD J. MOSSINGHOFF

Attesting Officer   Commissioner of Patents and Trademarks